Patented Oct. 18, 1932

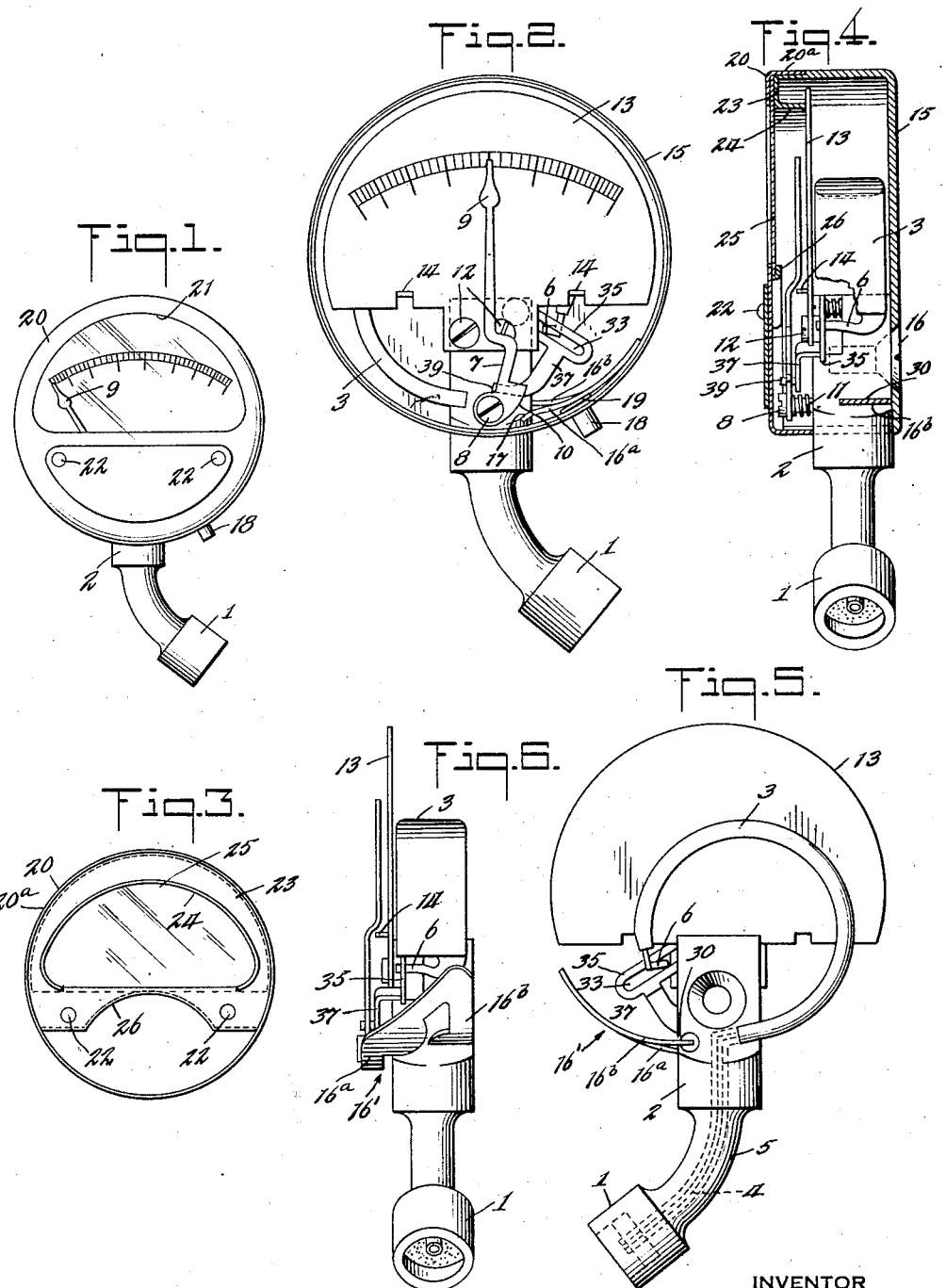

1,883,557

UNITED STATES PATENT OFFICE

MOSES E. CHENEY, OF LA CROSSE, WISCONSIN, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

TIRE TESTER

Application filed October 2, 1928. Serial No. 309,725.

This invention relates to pressure gauges of the type used to measure the pressure in an automobile tire, and more especially to those wherein the gauge indicates the pressure measured after removal from the tire, in any desired position for reading.

A feature of the invention consists in the provision of improved means for frictionally maintaining the pointer in the position indicating the maximum pressure applied until the gauge is removed from the tire and until it is desired to return the pointer to its zero position.

It is an object of the invention to provide a gauge mechanism of extreme simplicity, wherein gearing is not necessary, and wherein the parts may be constructed of more rugged materials than heretofore.

A further feature of the invention lies in the provision of means for returning the gauge pointer to its zero position at an accelerating rate of speed with a consequent reduction of the power transmitted so that the jarring and straining of parts incident to the arresting of the movement of the pointer are substantially avoided.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

Figure 1 is a front view of a complete pressure gauge embodying the improvements of the present invention; Fig. 2 is a front view thereof with the front cover removed; Fig. 3 is a rear view of the cover assembly; Fig. 4 is a side elevation, partly in section and partly broken away to aid in showing details of apparatus embodying the invention; Fig. 5 is a rear view of the movement and dial assembly; Fig. 6 is a side elevation of the mechanism of the gauge shown in the preceding figures removed from the gauge casing and other parts.

A mouthpiece 1 adapted to be applied to the tire, is desirably an integral part of a body piece 2, to which is attached one end of a Bourdon coil 3. The mouthpiece 1 communicates with the Bourdon coil 3 through a passage 4 that extends through the mouthpiece 1, stem 5, and body piece 2. Attached to the free end of Bourdon coil 3 is a hook 6, extending toward the front of the gauge for driving a bell-crank 35, 37.

Screw 8, which threads into the body piece 2, serves as a pivot for the pointer 9. The pointer 9 has a surface 7 engageable and operable by a drive finger 39, the drive finger being operable by the Bourdon coil, through the bell-crank 35, 37, to move the pointer away from the zero position. The pointer is also provided with a zero setting cam 10 through which the pointer is moved to zero position after the reading has been taken. Around the shank of screw 8 and between pointer 9 and body piece 2, is a coil spring 11, which exerts constant pressure on the pointer to urge it against the broad, flat inner surface of the screw head. Thus the head of the screw 8 co-operates with the shank thereof to form a bearing for the pointer and obviates the necessity of providing a long cylindrical bearing surface. Spring 11, in conjunction with the screw head, also serves to frictionally resist movement of the pointer, and hence to retain the pointer frictionally in any position to which it may be moved.

Also mounted on the body piece 2, by means of two screws 12, is a graduated plate 13 which serves as the dial of the instrument. Plate 13 has two lugs 14 bent forward at right angles to its surface to act as stops for the pointer at positions of maximum and zero pressure on the dial.

The body piece 2, with its associated parts, is mounted in a cup-shaped casing 15 having a hole through the back thereof for receiving a screw 16 which threads into body member 2 and constitutes means for securing the movement assembly in the casing. Lying within casing 15, and having its outer end supported thereby, is a reset spring 16', bifurcated at its inner end to provide two leaves 16ª and 16ᵇ. The rear leaf 16ᵇ is inserted in, and held by, a slotted recess 30 in body 2, while the front leaf 16ª is provided with an arc shaped section 17 that lies below the cam 10 on the pointer 9. Inserted through an aperture in the casing is a spring actuating plunger 18 having an enlarged head 19 at the inside of the casing to retain it therein. This plunger is so positioned that, when pressed inward, its head 19 exerts pressure upon the under side of spring leaf 16ª and raises this portion of the spring 16 to bring section 17 against cam 10 to reset the pointer to zero.

The casing is provided with a cover 20 consisting of a round plate having its rim turned rearwardly, as at 20ª, at right angles to its front surface, and having a substantially semi-elliptical opening 21. Attached to the inside of this cover plate 20 is a resilient member 23, having its inner rim turned rearwardly at right angles to its front surface to form a flange 24. Inserted between this member 23 and the cover piece 20 is a transparent window pane 25. The lower edge of the plate 23 is bent forwardly at right angles forming a lip or flange 26, whereby the entire plate is strengthened and more rigidly supported through its central section. The lip 26 also acts as a fixed stop and a support for the lower edge of the pane 25. Short screws, or preferably rivets 22, serve as the securing medium for holding the plate 23 securely to the front cover 20.

When the cover plate is placed on the instrument, the flange 24 of the member 23 presses against the dial plate 13, forcing the former closely against the margin of the window pane 25, thus co-operating in holding the parts solidly in correct position and eliminating vibration and rattle.

When the mouthpiece 1 is applied to any source of pressure to be measured, such as the valve of a tire, the Bourdon coil 3 is distended. The finger 6, carried by the Bourdon coil, works in a slot 33 of an arm 35 pivoted on the body number 2 and moves this arm together with an extension 37 thereof, to swing toward the right carrying a finger pin 39 which is the pointer driving finger previously referred to. The finger pin 39 engages the finger bearing surface 7 of the pointer and pulls the hand 9 over the dial from the zero position toward high graduations.

The provision of the bell-crank formed by the arms 35, 37 in the driving train for actuating the pointer for the Bourdon coil is a feature of primary importance. It will be seen that the tip of the pointer is driven through a compound lever system consisting of the lever 35, 37 and the pointer itself. The pin 39 of lever 35, 37 is more remote from the pivot of said lever than is the hook 6 of the Bourdon coil which drives said lever, so that the movement of the hook 6 is transmitted with multiplied effect to the pin 39. A further multiplication of movement, as applied to the pointer tip, is obviously effected by the pointer, itself, since the finger 39 engages the pointer close to the fulcrum thereof.

As a result of the provision of this very substantial movement multiplying train, it is possible to utilize a much stiffer, stronger Bourdon tube than would otherwise be practicable, while at the same time, the intricacy of parts and assembly involved in a geared movement is avoided. The arrangement, therefore, results in the production of a gauge which is considerably more rugged than prior instruments both from the standpoint of its ability to withstand damage from over-pressure and its ability to withstand damage from mechanical shocks.

A direction and disposition of the portion 7 of the pointer constitutes an important feature since it is by reason of the arrangement substantially as shown that symmetrical graduation of the dial with reference to the central indicating point thereof is made possible.

The surface 7 of the pointer over which the finger 39 travels, makes such an angle with a line joining the tip of the pointer to the fulcrum thereof that when the pointer indicates a central division of the scale the plane of the face 7, if extended, would substantially include the axis of the lever 35, 37. If such were the exact arrangement, it would theoretically provide for symmetrical subdivision of the scale with reference to the central point thereof, since the direction of movement of finger 39 would be at right angle with the surface 7 at the central point and would travel outward from the pivot of the pointer along the surface 7 to equal extents upon equal movements of the pointer in opposite directions from such central position.

Owing to the fact, however, that the pin 39 cannot practicably be made of knife-edge fineness, a slight deviation from the arrangement above indicated is desirable for compensating for the physical dimensions of the pin 39. The surface of the pin 39 which engages the inclined edge 7 of pointer 9 is desirably cylindrical in form and the arrangement actually adopted is such that the center of this cylindrical surface of the pin lies in the line drawn through the pivoting centers of the lever 35, 37 and the pointer 9 when the pointer occupies a central position on the scale. This arrangement provides for an exactly symmetrical disposition of the scale graduations.

When the source of pressure is removed, the Bourdon coil 3, the arm 35, and the finger pin 39 are returned to their normal positions through the spring action of the Bourdon tube. Finger 39 disengages pointer 9, and due to the pressure exerted by the spring 11, the head of the screw 8 acts as a friction retaining device so that pointer 9 retains a position indicating the maximum pressure applied, and may be read through window 25. The pointer 9 preferably has very small mass, and it will be understood that the small holding force exerted by spring 11 may, therefore, be small as compared with the force exerted by the Bourdon tube. Thus, for the purposes of this device, appreciable error is not introduced by the friction device provided by the head of screw 8 and spring 11.

After the pressure reading has been taken and it is desired to return the pointer to its zero position on the dial, plunger 18 is pressed with the thumb, lifting spring section 16ª and particularly portion 17 into engagement with cam 10 to reset the pointer. The shape of the pointer cam 10 performs a two-fold function, firstly, that of accelerating the movement of the pointer as it is moved toward the zero mark, and secondly, that of reducing the mechanical effectiveness of the power transmitted to the pointer by the pressure exerted on the button 18, so that any unusual jar, when the movement of the pointer is arrested at the zero mark, is precluded.

Without further analysis, the foregoing will so fully reveal the gist of this invention that others can, by applying current knowledge, readily adapt it for various utilizations by retaining one or more of the features that from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. In a pressure gauge mechanism, a pressure responsive element, a pointer provided with a cam, transmission mechanism between said pressure responsive element and pointer to drive the same in one direction, and a hand return mechanism comprising a plunger, a divided spring having the free end of one of its leaves located beneath the cam on said pointer and the other leaf secured to a stationary part of the pressure gauge mechanism, and a finger piece beneath said spring and manually operable to force the spring against the cam to move the hand.

2. The combination of an expansible and contractile member with a pointer pivoted at one end, an actuator pivoted at one end and having its free end engaging the edge of the pointer adjacent its pivot and capable of sliding along said edge, the engaging surface of said pointer when the said pointer is at its midway position being in line with the pivots of said pointer and actuator and means connecting the expansible member with said actuator.

3. In a pressure gauge the combination of an expansible pressure member with an indicating member pivoted at one end, a pivoted actuator having its free end in sliding engagement with the edge of said indicating member intermediate its pivot and its tip and capable of sliding over said edge towards the said tip, the said edge of the indicating member being in alinement with the pivots of the indicating member and actuator at the midway position of said indicating member and a connecting means between said expansible member and said actuator.

4. In a pressure gauge, a dial and a pivoted pointer having a portion thereof inclined to the remainder of said pointer in combination with a pivoted actuator for the pointer with a part thereof to bear against said inclined portion and a Bourdon tube acting upon said pivoted actuator.

In witness whereof, I have hereunto subscribed my name.

MOSES E. CHENEY.